United States Patent
Kadota

[19]

[11] Patent Number: 5,878,713
[45] Date of Patent: Mar. 9, 1999

[54] FUEL CONTROL SYSTEM FOR CYLINDER INJECTION TYPE INTERNAL COMBUSTION ENGINE

[75] Inventor: Yoichi Kadota, Tokyo, Japan

[73] Assignee: Mitsubushi Denki Kabushiki Kaisha, Tokyo, Japan

[21] Appl. No.: 968,570

[22] Filed: Nov. 12, 1997

[51] Int. Cl.$^6$ .............................. F02D 45/00; F02B 3/02
[52] U.S. Cl. ........................................... 123/305; 123/501
[58] Field of Search ................................... 123/305, 295, 123/500, 501

[56] References Cited

U.S. PATENT DOCUMENTS

| | | | |
|---|---|---|---|
| 4,926,806 | 5/1990 | Ahern | 123/305 |
| 5,339,583 | 8/1994 | Matsuura | 123/305 |
| 5,676,108 | 10/1997 | Akimoto | 123/305 |
| 5,730,105 | 3/1998 | McGinnity | 123/305 |
| 5,735,241 | 4/1998 | Matsuura | 123/305 |

FOREIGN PATENT DOCUMENTS 4-237854   8/1992   Japan .

Primary Examiner—Carl S. Miller
Attorney, Agent, or Firm—Sughrue, Mion, Zinn, Macpeak & Seas, PLLC

[57] ABSTRACT

A fuel control system for a cylinder injection type engine capable of preventing overlap between periods for the fuel injections for a plurality of engine cylinders while reducing burden imposed on injector drivers and allowing the fuel control system to be implemented on a small circuit scale at low cost by limiting fuel injection timings for driving the injectors. The system includes an air flow sensor (2) for outputting information concerning an intake air flow, a crank angle sensor (5) for outputting information concerning rotation speed of the engine (1) and a crank angle, fuel injectors (11A) for injecting fuel directly into individual engine cylinders, and a control unit (8A) for driving the fuel injectors on the basis of the abovementioned information. The control unit (8A) is so arranged as to arithmetically determine a fuel injection quantity and fuel injection timings for driving the fuel injector (11A) at least in one of suction stroke and compression stroke. The control unit (8A) limits a change of fuel injection timing of the injector in a leading direction so that the change in the fuel injection timing does not exceed a predetermined value, and sets the fuel injection timing at a time point corresponding to a lapse of a predetermined time from the preceding fuel injection.

3 Claims, 6 Drawing Sheets

FUEL CONTROL SYSTEM FOR CYLINDER INJECTION TYPE INTERNAL COMBUSTION ENGINE

BACKGROUND OF THE INVENTION

1. Field of the Invention

The present invention relates generally to a fuel control system for a cylinder injection type internal combustion engine for a motor vehicle in which fuel is injected directly into engine cylinders. More specifically, the present invention is concerned with a fuel control system for the cylinder injection type internal combustion engine which system is so designed as to positively prevent fuel injectors for a plurality of engine cylinders from being actuated simultaneously in order to allow the fuel injectors to be driven by using a power supply source of a low capacity.

2. Description of Related Art

In general, in the internal combustion engine for the motor vehicle and others, an injector for fuel injection is installed in an intake manifold of an intake pipe of the engine so that the fuel as injected is charged into engine cylinders together with the intake air.

For having better understanding of the principle underlying the invention, technical background thereof will be described in some detail. FIG. 4 is a schematic diagram showing a conventional fuel control system for an internal combustion engine in which a fuel injector is mounted on an intake pipe.

Referring to FIG. 4, an internal combustion engine 1 for a motor vehicle includes a plurality of cylinders. For simplification, only one of the cylinders is shown representatively in FIG. 4. The engine 1 is equipped with an intake pipe or manifold 1a which serves for charging a mixture of intake air and fuel into the engine 1. An exhaust gas resulting from the combustion of the air-fuel mixture within the engine 1 is discharged through an exhaust pipe 1b. A crank shaft 1c is driven rotationally by the engine 1. Cooling water 1d is fed for cooling the engine 1.

An air flow sensor 2 is installed at an inlet port of the intake pipe 1a for measuring the amount of air fed to the engine 1, whereby intake air flow information A is outputted as a detection signal by the air flow sensor 2. Furthermore, mounted within the intake pipe 1a is a throttle valve 3 which is operatively coupled to an accelerator pedal (not shown) operated by a driver of the motor vehicle, for regulating the air flow supplied to the engine 1 in dependence on the depression stroke of the accelerator pedal.

For the purpose of detecting angular positions of the throttle valve 3, i.e., the throttle opening degree $\theta$, a throttle position sensor 4 is provided in association with the throttle valve 3. Provided in association with the crank shaft 1c is a crank angle sensor 5 for detecting the rotation speed of the crank shaft 1c to thereby output a pulse signal RE having a variable repetition frequency indicative of the rotation speed of the crank shaft 1c. Thus, it is possible to derive from the pulse signal RE information concerning the rotation speed (rpm) of the engine 1 as well as information concerning the angular position of the crank shaft 1c.

Temperature Tw of cooling water 1d is detected by a water temperature sensor 6 which thus serves as a means for detecting the warmed-up state of the engine 1.

An $O_2$-sensor 7 is provided in association with the exhaust pipe 1b for detecting an oxygen concentration Do of the exhaust gas discharged from the engine 1 into the exhaust pipe 1b.

For the purpose of controlling the operations of the internal combustion engine system described above, a control unit 8 is provided, which may be implemented in the form of a microprocessor or microcomputer. The detection signals A, $\theta$, RE, Tw and Do outputted from the various sensors 2, 4, 5, 6 and 7 mentioned above are supplied as the input information to the control unit 8 which in turn outputs control signals B, J and Q for various devices or units in response to the input information to thereby perform various sequence controls inclusive of the fuel injection control and the ignition timing control for each of the cylinders of the engine 1, as will be described hereinafter.

More specifically, the control unit 8 makes decision as to the operation state of the engine 1 on the basis of the various sensor output information A, $\theta$, RE, Tw and Do mentioned above to arithmetically determine various control quantities in dependence on the detected operation state of the engine 1 and output various operation control signals B, J and Q for allowing the engine 1 to be driven with desired air-fuel ratio and ignition timing.

To this end, a spark plug 9 is mounted within each of the cylinders of the engine 1, being exposed to the combustion chamber defined within the cylinder, wherein the firing of the spark plug 9 is controlled by the ignition timing control signal Q outputted from the control unit 8.

As can be seen in FIG. 4, provided in parallel to the intake pipe 1a across the throttle valve 3 is a bypass passage BP in which an air bypass valve 10 is installed for selectively opening or closing the bypass passage BP. Thus, it is possible to control the air flow bypassing the throttle valve 3 by controlling the air bypass valve 10.

More specifically, operation of the air bypass valve 10 is controlled by the bypass control signal B outputted from the control unit 8, whereby the rate of air flow bypassing the throttle valve 3 can be regulated. In this way, engine rotation speed control in the idling operation state of the engine in which the throttle valve 3 is fully closed as well as engine torque control in the running state of the motor vehicle can be realized.

Referring continuously to FIG. 4, a fuel injector 11 is mounted within the intake manifold located downstream of the intake pipe 1a. Operation of the fuel injector 11 is controlled by the fuel injection control signal J outputted from the control unit 8, whereby the quantity of fuel supplied to the engine 1 is controlled correspondingly.

The fuel is stored in a fuel tank 12 and taken out by means of a fuel pump 13.

Disposed between the fuel pump 13 and the fuel injector 11 is a fuel pressure regulator 14 which serves for control a fuel pressure Pb at the intake port of the fuel injector 11 in dependence on the intake pipe pressure (pressure prevailing within the intake pipe) Pa.

The intake pipe pressure Pa can be measured through the medium of a pipe communicated to the intake pipe 1a, while the fuel pressure Pb is so controlled that the differential pressure (Pb–Pa) is maintained to be constant (at ca. 3 atm.) with reference to the intake pipe pressure Pa by means of an elastic valve element (not shown) incorporated in the fuel pressure regulator 14 so as to operate in response to the intake pipe pressure Pa.

Thus, in the system in which the fuel is fed to the engine cylinders from the fuel injector 11 disposed in the intake pipe 1a, as shown in FIG. 4, the fuel pressure Pb at the fuel injector 11 is so controlled as to assume a level corresponding to the intake pipe pressure Pa plus a predetermined pressure (ordinarily a ca. 3 atm.) by means of the fuel pressure regulator 14.

Now, the principle of the fuel injection in the system described above will be elucidated.

When the fuel injector 11 is driven in response to the fuel injection control signal J issued by the control unit 8, a fuel supply passage is opened or established between the fuel tank 12 (fuel supply source) and the intake port (fuel injection port) of the fuel injector 11, whereby the fuel is injected into the intake pipe 1a under the differential pressure (ca. 3 atm.) between the fuel pressure Pb of the fuel supply source and the intake pipe pressure Pa acting on the fuel injection port of the injector 11.

In the fuel injection system in which the fuel is injected by the injector mounted externally of the engine cylinder, as shown in FIG. 4, a part of the fuel injected from the injector 11 will adhere to inner walls of the intake pipe 1a and surfaces of the intake valves of the engine 1, which means that loss occurs in the amount of the fuel to be injected into the engine cylinders. In this conjunction, it is noted that such fuel deposition has to be taken into consideration particularly when the engine is operating at a low temperature (such as engine starting operation) and when the engine is in a transient operation state where the amount of fuel to be supplied to the engine has to be changed at a relatively high speed. In the above-mentioned cases, the quantity of fuel to be supplied to the engine tends to increase, exerting unwanted influence to the content of harmful components carried by the exhaust gas.

Under the circumstances, there has been developed a cylinder injection type engine equipped with a fuel control system which is designed for injecting the fuel directly into the engine cylinders by controlling the fuel injection timings for a plurality of fuel injectors, as is disclosed, for example, in Japanese Unexamined Patent Application Publication No. 237854/1992 (JP-A-4-237854).

When such direct fuel injection control system is used for conventional gasoline engines, there can be realized advantageous effects mentioned below.

(1) Reduction of the content of harmful gases contained in the exhaust gas

Since the fuel is directly injected into the combustion chamber in the vicinity of the spark plug 9 (see FIG. 4), the air-fuel ratio may be lowered so that the air-fuel mixture becomes lean without taking into consideration the delay involved in the transportation of the fuel, whereby contents of harmful HC (hydro carbon) gas and CO (carbon monoxide) gas carried by the exhaust gas can be reduced.

(2) Reduction of fuel cost

Because the fuel is injected immediately before the ignition timing, there is formed a mass of combustible fuel mixture around the spark plug 9 at the time of ignition, making nonuniform the distribution of the gas mixture containing the fuel. Thus, the fuel-air mixture undergoes a so-called stratified combustion. Consequently, the air-fuel ratio in appearance between the amount of air and that of the fuel charged into the engine cylinder can be significantly decreased so that the air-fuel ratio of the air-fuel mixture becomes correspondingly lean.

Besides, owing to realization of the stratified combustion, combustion of the air-fuel mixture is scarcely affected adversely even when the exhaust gas is recirculated with an increased ratio (i.e., notwithstanding of increased exhaust gas recirculation or EGR in abbreviation). By virtue of this feature, the intake air quantity can be increased with pumping loss being reduced, which can enhance the fuel-cost performance of the internal combustion engine system.

(3) Increased output power of the engine

Since the air-fuel mixture is substantially concentrated around the spark plug 9, the amount of end gas (air-fuel mixture gas in the regions located remotely from the spark plug 9) decreases favorably to the stratified combustion mentioned above, whereby the anti-knocking performance of the engine can be enhanced with the compression ratio in the engine 1 being increased.

Furthermore, because the fuel is converted into gas or gasified within the cylinder, the intake air is deprived of heat as vaporization heat. Consequently, the density of the intake air can be increased, which is effective for enhancing the volumetric efficiency.

(4) Enhancement of drivability

By virtue of the direct fuel injection into the cylinder, the time taken for generation of output torque by the engine 1 from the fuel injection through the fuel combustion is shorter when compared with the engine system shown in FIG. 4, whereby the internal combustion engine system capable of responding to the demand of the driver with high speed can be realized.

Since the advantageous effects such as mentioned above are expected to be obtained, the cylinder injection type fuel control system tends to be very attractive as the ideal fuel control system for the internal combustion engine.

In this conjunction, it is however noted that in the cylinder injection type fuel control system, the fuel pressure applied to the injector should be higher than the pressure within the cylinder into which the fuel is injected and is usually set at a high pressure on the order of several ten atm.

However, the pressure within the cylinder into which the fuel is directly injected (hereinafter this pressure will also be referred to as the intra-cylinder pressure) changes significantly in dependence on the four-cycle engine strokes (suction, compression, combustion and exhaust strokes) as well as positions of the crank shaft 1c and the piston, which in turns means that differential pressure between the fuel pressure and the intra-cylinder pressure varies correspondingly. As a result, the relation between the injector actuating or driving time point and the amount of the fuel injected actually from the fuel injector changes under the influence of the intra-cylinder pressure prevailing at the time point of fuel injection.

In the following, a fuel control system for a cylinder injection type internal combustion engine will be described in more concrete.

FIG. 5 is a schematic diagram showing generally a structure of a conventional fuel control system for a cylinder injection type internal combustion engine. In FIG. 5, components or parts same as or equivalent to those mentioned hereinbefore are denoted by like reference characters as those used in FIG. 4 and repeated description thereof is omitted.

Referring to FIG. 5, a control unit 8A fetches a cylinder identifying signal SG outputted from a cylinder identifying sensor (not shown), and a fuel injector denoted by reference numeral 11A is installed directly in the combustion chamber of the cylinder of the engine 1. For controlling the direct fuel injection, the control unit 8A of the fuel control system now under consideration is so designed as to arithmetically determine the amount of the fuel for injection and the injection timing for thereby controlling operation of the fuel injector 11A in accordance with the result of the arithmetic operation at least in one of the suction stroke and the compression stroke.

A fuel pump 13A and a fuel pressure regulator 14A constituting parts of the fuel supply system differ from those of the system shown in FIG. 4 in that the fuel pump 13A is designed for supplying or feeding the fuel at a high pressure while the fuel pressure regulator 14A is so designed as to control the fuel pressure Pb applied to the direct fuel injector 11A to be constant at a high pressure (ca. several ten atm.) with reference to the atmospheric pressure PA.

Further, an injector driver 15 is provided for driving the injectors 11A with high output power and designed so as to output a power-amplified injection control signal K in response to the fuel injection control signal J issued by issued by the control unit 8A.

Additionally, a cylinder identifying sensor 16 is provided for identifying the cylinder to be controlled for thereby outputting the cylinder identifying signal SG to the control unit 8A in response to the operation of the intake valve of the engine 1.

In the fuel control system for the cylinder injection type engine such as shown in FIG. 5, the injector driver 15 is provided separately from the control unit 8A in order to drive the fuel injector 11A with very high power by overcoming the intra-cylinder pressure. Besides, because of the necessity for controlling individually the fuel injectors 11A on a cylinder-by-cylinder basis, the cylinder identifying sensor 16 is provided for identifying the cylinder to be controlled.

As will be understood from the above, the direct fuel injector 11A is supplied with fuel at high pressure. Consequently, a fuel supply controlling movable member (e.g. plunger not shown) incorporated in the direct fuel injector 11A has to be implemented in such structure as to be capable of feeding the fuel by overcoming the high fuel pressure Pb applied to the fuel injector 11A.

For these reasons, the spring constant for the spring for actuating the plunger (not shown) incorporated in the direct fuel injector 11A is set at a high value. In this conjunction, it is noted that in the direct fuel injector 11A, the plunger is actuated under the electromagnetic force generated by a coil upon electric energization thereof in response to an electric injection control signal K. Thus, it goes without saying that the coil or solenoid for actuating the plunger has to be so designed as to be capable of generating the electromagnetic force of large magnitude sufficient for overcoming the preset high spring constant of the spring provided in association with the plunger.

In order to meet the requirement mentioned above, the solenoid or coil of the plunger of the direct fuel injector 11A is designed to exhibit low impedance, as a result of which a large current is required for energization of the coil for the plunger. Thus, great difficulty will be encountered in the attempt for integrally incorporating the injector driver 15 in the control unit 8A.

Such being the circumstances, in most of the fuel control system for the cylinder injection type internal combustion engine, the injector driver 15 dedicated for driving the fuel injector 11A is provided separately from the control unit BA, as can be seen in FIG. 5.

Next referring to FIG. 6, the principle of operation of the injector driver 15 shown in FIG. 5 will be described.

In the internal combustion engine 1 of the cylinder injection type, driving force of a great magnitude is required for operating the direct fuel injector 11A, as mentioned above. Besides, fuel injection must be performed only during the suction stroke and the compression stroke. For these reasons, the direct fuel injector 11A is usually driven by resorting to overexcitation technique.

FIG. 6 is a waveform diagram illustrating the injection control signal K and a driving current I flowing through the coil or solenoid of the fuel injector 11A upon driving thereof with overexcitation. Referring to FIG. 6, the driving operation of the fuel injector 11A is started with overexcitation at a time point TON and terminated at a time point TOFF2 with the overexcitation driving period ending at a time point TOFF1. Upon start of the fuel injection, the plunger of the injector is driven with the overexcitation current I1 and held with a holding current I2.

More specifically, when the injection control signal K of high power is outputted from the injector driver 15 in response to the fuel injection control signal J issued by the control unit 8A at the time point TON, the driving current I rises up instantaneously to the high level I1. Thus, the plunger of the fuel injector 11A is speedily actuated immediately after the time point TON.

When the direct fuel injector 11A is opened due to the actuation of the plunger, the driving current I assumes the low level I2 at the time point TOFF1, whereon the holding current I2 is sustained up to the time point TOFF2 at which the driving current I of the fuel injector 11A is interrupted in response to clearing of the injection control signal K delivered from the injector driver 15. Thus, the direct fuel injector 11A is closed substantially at the time point TOFF2.

Next, referring to FIG. 7, description will be turned to a typical structure of the injector driver 15. Incidentally, FIG. 7 is a block diagram illustrating an internal structure of the injector driver 15 on the assumption, only by way of example, that the internal combustion engine of concern includes four cylinders #1, . . . , #4 and that injection control signals K1, . . . , K4 for the cylinders #1, . . . , #4 are sequentially outputted in response to fuel injection control signals J1, . . . , J4 for the cylinders #1, . . . , #4, respectively.

Referring to FIG. 7, a high-voltage generating circuit 401 serves as a power supply for generating a high voltage VH, starting from a battery voltage VB, to thereby output a large or high-level current I1 (see FIG. 6) during a period from the time point TON to the time point TOFF1 (this period will be hereinafter referred to also as the overexcitation period).

Ordinarily, in the motor vehicle, the battery voltage VB is on the order of 14 volts. The high-voltage generating circuit 401 is so designed as to generate the high voltage VH boosted up to several ten volts.

The high-voltage generating circuit 401 should ideally be implemented with a large capacity sufficient for driving the four injectors 11A simultaneously. Alternatively, a same number of high-voltage generating circuits as the direct fuel injectors 11A should be provided separately for the these injectors 11A, respectively. However, in view of the fact that implementation of the high-voltage generating circuit 401 on a small scale is preferable for the practical purpose and that for the direct fuel injection, the injection timing is restricted with the fuel injection being performed basically sequentially on a cylinder-by-cylinder basis, the high-voltage generating circuit 401 is usually realized on a circuit scale capable of supplying a large current enough for driving only one direct fuel injector 11A with the overexcitation current.

The injector driver 15 further includes waveform shaping circuits 402 to 405 provided for the individual cylinders, respectively, for shaping the fuel injection control signals J1, . . . , J4 supplied from the control unit 8A on a cylinder-by-cylinder basis to thereby output waveform-shaped signals J1', . . . , J4', respectively. Additionally, the injector driver 15 includes an overexcitation signal generating circuit 406 for generating an overexcitation signal DH on the basis of the high voltage VH and the waveform-shaped signals J1', . . . , J4'. Furthermore, driving circuits 407, . . . , 410 are provided in association with the engine cylinders, respectively, for generating injection control signals K1, . . . , K4 on the basis of the overexcitation signal DH and the waveform-shaped signals 31', . . . , J4', respectively.

Referring to FIG. 7, the overexcitation signal generating circuit 406 is supplied with the high voltage VH to output the overexcitation signal DH to the driving circuits 407, . . . , 410 for driving the associated direct fuel injector 11A, respectively, with overexcitation until the driving current I of the direct fuel injector 11A rises up to the predetermined high level I1.

The driving circuits 407, . . . , 410 fetch the waveform-shaped signals J1', . . . , J4', respectively, and the overexcitation signal DH, to thereby output the injection control signals K1, . . . , K4 to the fuel injectors 11A for the cylinders, respectively, to thereby cause the driving current I to flow through the fuel injector, as shown in FIG. 6.

Now, it is supposed, by way of example, that two direct fuel injectors 11A are to be simultaneously activated by means of the injector driver 15 shown in FIG. 7 with the overexcitation current. In that case, however, since it is presumed that the high-voltage generating circuit 401 is implemented with the current supply capacity capable of driving only one injector with the overexcitation current, no more than one fuel injector 11A can be driven with the overexcitation current at one time, incurring thus a delay in the driving of the other injector (delay in the fuel injection timing) or failure in driving the other injector in the worst case.

Next referring to FIGS. 8A to 8D, the simultaneous overexcitation will be described in detail.

FIGS. 8A to 8D are timing charts for illustrating, by way of example, fuel injection timing controls when the operation mode of the engine 1 is changed over from the compression stroke injection mode to the suction stroke injection mode. Such change-over of the fuel injection timing control mode is automatically effectuated by the control unit 8A when the operation mode of the engine is changed over to the accelerating operation mode.

More specifically, in the normal engine operation mode, the fuel injection is carried out in the compression stroke with a view to reducing the fuel cost by making the air-fuel mixture lean. However, in the accelerating operation mode of the engine, the fuel injection is carried out in the suction stroke in order to enrich the air-fuel mixture for thereby increasing the output power of the engine.

In that case, in the transient state intervening between the compression stroke mode and the suction stroke mode, there may arise the possibility that coincidence or overlap occurs between the current fuel injection timing and the preceding fuel injection timing.

Referring to FIG. 8A, the cylinder identifying signal SG outputted from the cylinder identifying sensor 16 indicates a specific cylinder #1 which is in the compression stroke (#1 TOP). The pulse signal RE outputted from the crank angle sensor 5 represents crank angle reference position B75° (75° before the top dead center) and B5° (5° before the top dead center) for each of the engine cylinders #1, . . . , #4.

The control unit 8A identifies the fuel injector 11A to be controlled on the basis of the information contained in the cylinder identifying signal SG and predicts or estimates the rotational positions of the crank shaft 1c for each of the engine cylinders, respectively, on the basis of the frequency or period of the pulse signal RE to thereby perform the control such as the fuel injection timing control.

In the conventional four-cylinder engine, the pulse signal RE includes pulses inverting at the crank angles of B5° and B75° periodically with an interval of 180° CA (in terms of the crank angle) for each of the engine cylinders. The control unit 8A fetches various information including the intake air flow information A in the engine 1 at every reference position B5° to decide the engine operation state for thereby arithmetically determining the control quantities which are outputted in the form of the various control signals B, J and Q mentioned previously.

FIGS. 8B to 8D are timing charts showing the fuel injection control signals J1, . . . , J4 for the individual cylinders (#1, . . . , #4), respectively. The fuel injection is performed every time the fuel injection control signals J1, . . . , J4 assume a high level (H-level).

More specifically, FIG. 8B shows waveforms for the fuel injections in the compression stroke injection mode in which the fuel injection is performed immediately before the compression stroke (TOP) for each of the engine cylinders. On the other hand, FIG. 8C shows waveforms for the fuel injections in the suction stroke injection mode. As can be seen from FIG. 8C, the fuel injection is performed in the suction stroke which precedes to the compression stroke by 180° CA in each of the engine cylinders.

It can further be seen that in the fuel injection in the compression stroke in which the air-fuel mixture is lean (FIG. 8A), the pulse width of the fuel injection control signals J1, . . . , J4 is set short, while in the fuel injection in the suction stroke in which the air-fuel mixture is rich, the pulse width of the fuel injection control signals J1, . . . , J4 is set long.

Finally, FIG. 8D shows waveform of the injection pulses in the transient state of the engine which intervenes between the fuel injection in the compression stroke (FIG. 8B) and the fuel injection in the suction stroke (FIG. 8C). It can be seen from FIG. 8D that the fuel injection is performed sequentially for the cylinders #1 and #3 in the compression stroke and thereafter the fuel injection is performed for the cylinder #4 in the suction stroke.

Consequently, the injection timing for the cylinder #4 advances or shifts in the leading direction about one stroke (180° CA) when compared with the injection in the compression stroke (refer to the pulse depicted by a broken line). As a result of this, the injection pulse waveform representing the injection in the compression stroke for the cylinder #3 overlaps with the injection pulse waveform representing the fuel injection in the suction stroke for the cylinder #4.

For the reason mentioned above, the output power of the injector driver 15 mentioned previously may become too insufficient to drive the fuel injector 11A for one of the cylinders #3 and #4 or both of them satisfactorily, which will of course incur lowering in the output power or torque of the engine 1 due to loss of the combustion.

The problem mentioned above may be coped with by increasing the current supply capability or capacity of the high-voltage generating circuit 401 to such a level that the overexcitation driving of plural fuel injectors can be realized. However, in that case, the circuit scale of the injector driver 15 will necessarily increase, unfavorably for practical applications.

As will now be understood from the foregoing description, in the fuel control system for the cylinder injection type engine known heretofore, the high-voltage generating circuit 401 (see FIG. 7) incorporated in the injector driver 15 is of such a current supply capacity which is sufficient for overexciting only one fuel injector 11A. Consequently, when the simultaneous fuel injection is to be performed for a plurality (e.g. two) of the engine cylinders, the overexcitation fuel injection control can be performed for no more than one injector 11A, incurring a delay in the start timing for the fuel injection control and loss of the fuel injection in the worst case, giving rise to problems.

For solving the problems mentioned above, it may be conceived to increase the current supply capability or capacity of the high-voltage generating circuit 401 to a level capable of driving simultaneously a plurality of fuel injectors. In that case, however, the circuit scale of the high-voltage generating circuit 401 increases undesirably in view of the manufacturing cost, unfavorably from the economical and practical viewpoint.

Furthermore, overlap of the fuel injector actuation timings between the engine cylinders may be avoided by such control processing that upon every actuation timing for the direct fuel injectors 11A of the individual engine cylinders, proximity of the actuation timing for the fuel injectors 11A of the other cylinders is checked for all the fuel injectors 11A. In that case, the burden or overhead imposed on the control unit BA for executing the above-mentioned processing upon every fuel injection will increase intolerably.

SUMMARY OF THE INVENTION

In the light of the state of the art described above, it is an object of the present invention to provide a fuel control system for the cylinder injection type internal combustion engine which is capable of preventing overlap between periods for the fuel injections for a plurality of engine cylinders while reducing burden imposed on the injector driver and allowing the fuel control system to be implemented on a small scale at low cost by limiting the fuel injection timings for driving the fuel injectors through a simple control procedure.

In view of the above and other objects which will become apparent as the description proceeds, there is provided according to a general aspect of the present invention a fuel control system for a cylinder injection type internal combustion engine, which includes an air flow sensor provided in association with an intake pipe of the internal combustion engine for detecting an intake air flow supplied to the internal combustion engine to thereby output corresponding information, a crank angle sensor for detecting rotation speed of the internal combustion engine and a crank angle thereof to thereby output corresponding information, a fuel injector for injecting fuel directly into individual cylinders of the internal combustion engine, and a control unit for driving the direct fuel injector on the basis of the information. The control unit is so arranged as to arithmetically determine a fuel injection quantity and fuel injection timings for the engine on the basis of the aforementioned information for thereby driving the direct fuel injector in accordance with the result of the arithmetic operation at least in one of suction stroke and compression stroke of the internal combustion engine. The control unit further includes a means for limiting a change or shift of every fuel injection timing of the direct fuel injector in a leading direction so that the change in the fuel injection timing does not exceed a predetermined value, and a means for setting the fuel injection timing at a time point corresponding to a lapse of a predetermined period from the preceding fuel injection control.

In a preferred mode for carrying out the invention, the predetermined value may be set variably in dependence on the engine rotation number of the internal combustion engine.

In another preferred mode for carrying out the invention, limitation of the change of the fuel injection timing may be performed only during a transient period immediately succeeding to a change-over in operation mode of the internal combustion engine.

In a further preferred mode for carrying out the invention, the predetermined value may be so selected as to be smaller than a value corresponding to an interval intervening between ignition timings for the individual cylinders.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIGS. 2A and 2B are timing charts for illustrating operations of the fuel control system for the cylinder injection type engine according to an embodiment of the invention, wherein FIG. 2A illustrates a waveform of a cylinder identifying signal, and FIG. 2B illustrates fuel injection timings in compression and suction strokes, respectively, of the cylinder injection type engine according to an exemplary embodiment of the invention;

DESCRIPTION OF THE PREFERRED EMBODIMENTS

Figure 1:
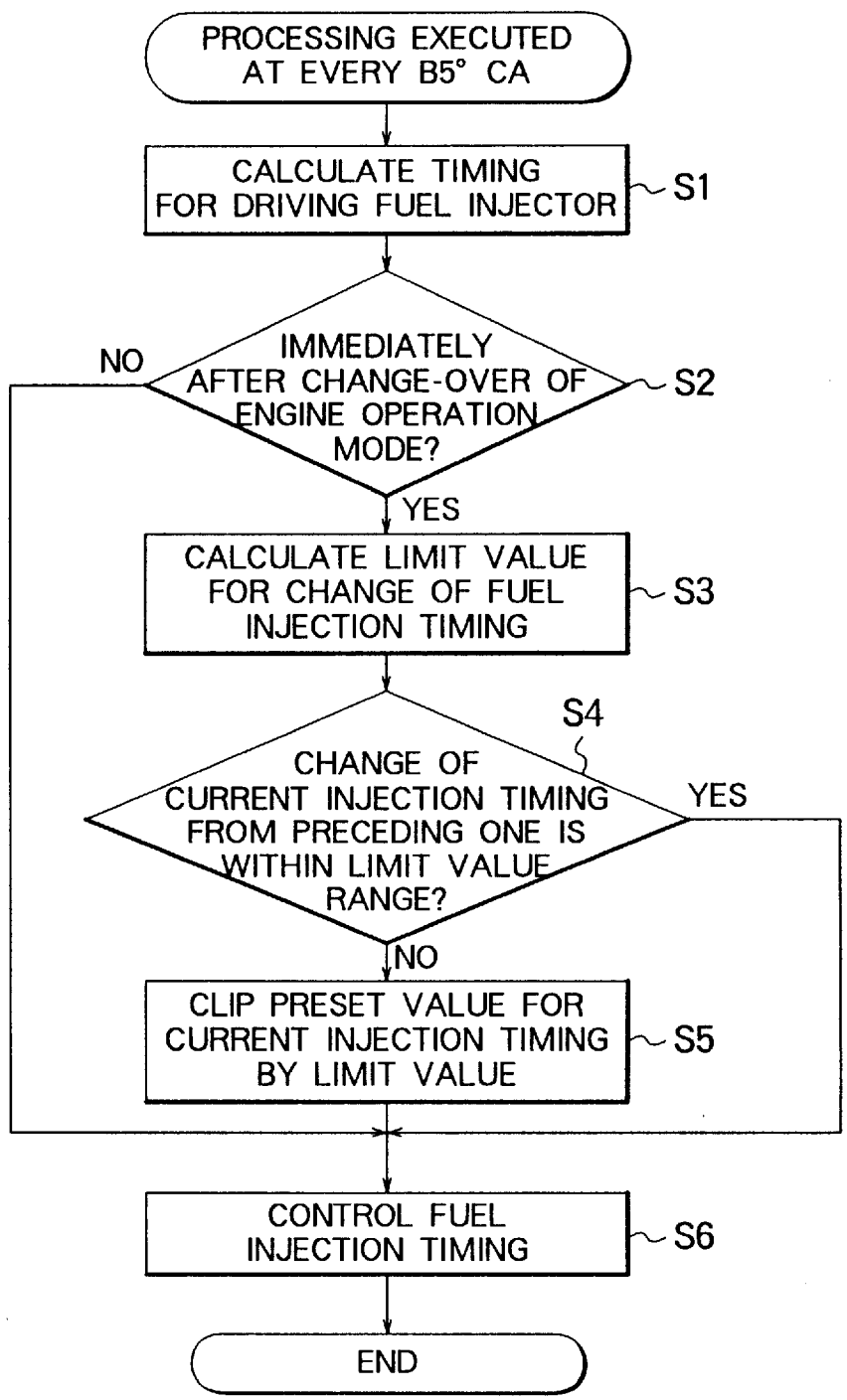
FIG. 1 is a flow chart for illustrating a sequence of controls in a fuel control system for a cylinder injection type engine according to an exemplary embodiment of the present invention.

Now, the present invention will be described in detail in conjunction with what is presently considered as preferred or typical embodiments thereof by reference to the drawings. In the following description, like reference characters designate like or corresponding parts throughout the several views.

Embodiment 1

Figure 2A:
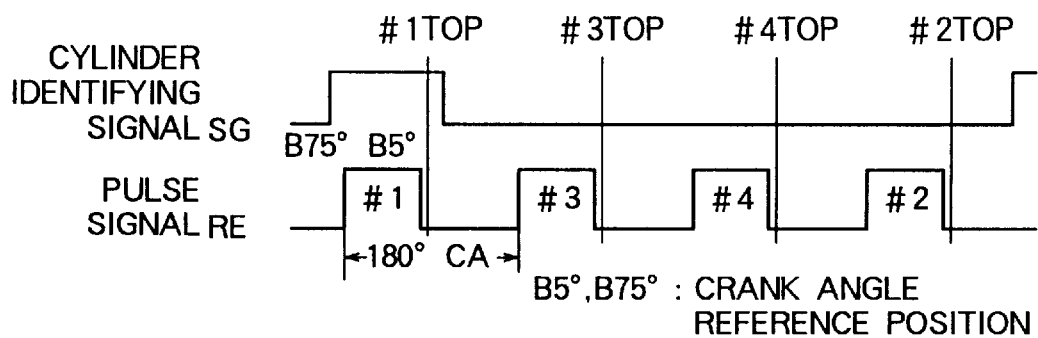
Figure 2B:
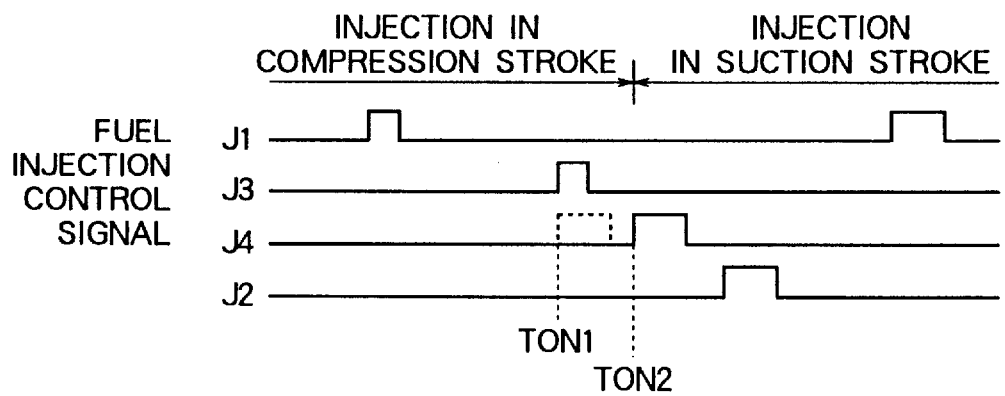
Figure 3:
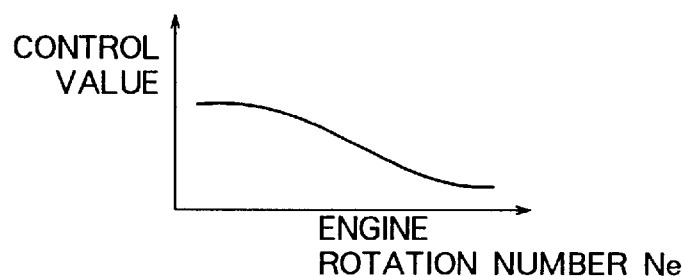
FIG. 3 is a characteristic diagram for illustrating limit value calculating operation in a step S3 shown in FIG. 1.
Figure 4:
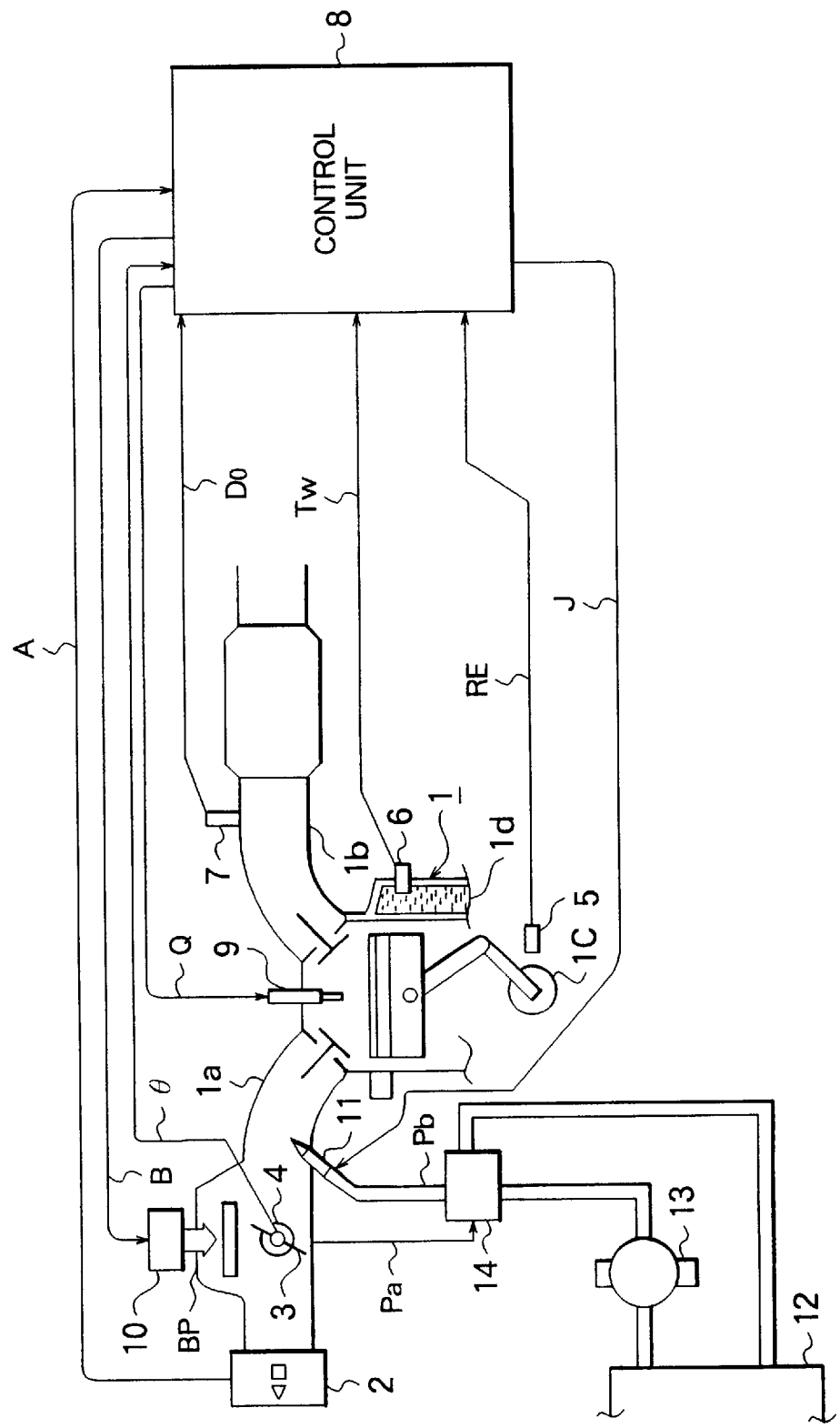
FIG. 4 is a schematic diagram showing a conventional fuel control system for an internal combustion engine in which a fuel injector is installed within an intake pipe.

Now, the fuel control system for the cylinder injection type internal combustion engine according to a first embodiment of the invention will be described by reference to FIGS. 1, 2A, 2B and 3 in which FIG. 1 is a flow chart for illustrating a sequence of controls in the system according to the first embodiment of the invention, FIGS. 2A and 2B are timing charts for illustrating operation of the cylinder injection type fuel control system according to the first embodiment of the invention, and FIG. 3 is a characteristic diagram for illustrating a limit value calculating operation in a step S3 shown in FIG. 1.

Figure 5:
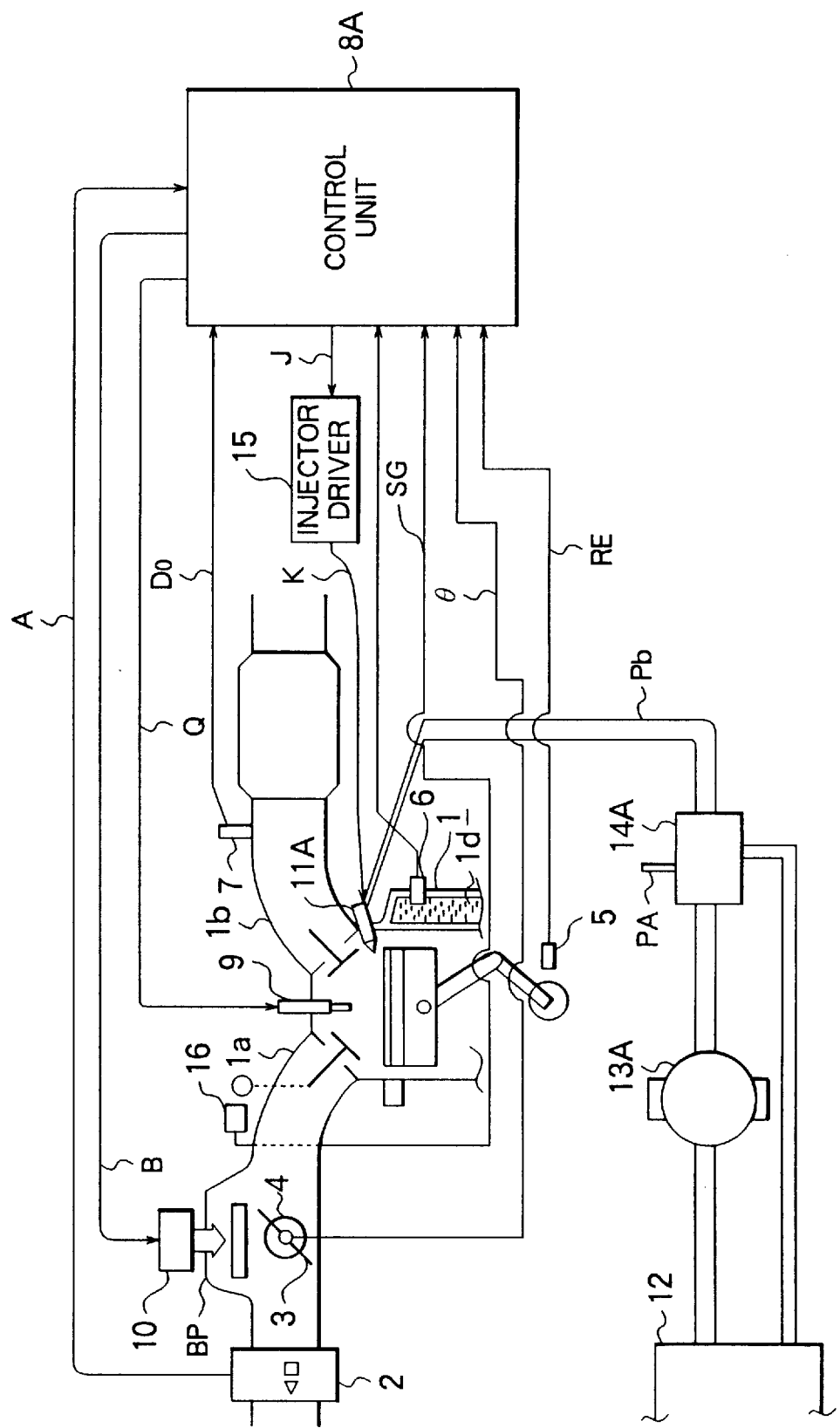
FIG. 5 is a schematic diagram showing a structure of a fuel control system for a cylinder injection type engine known heretofore.
Figure 7:
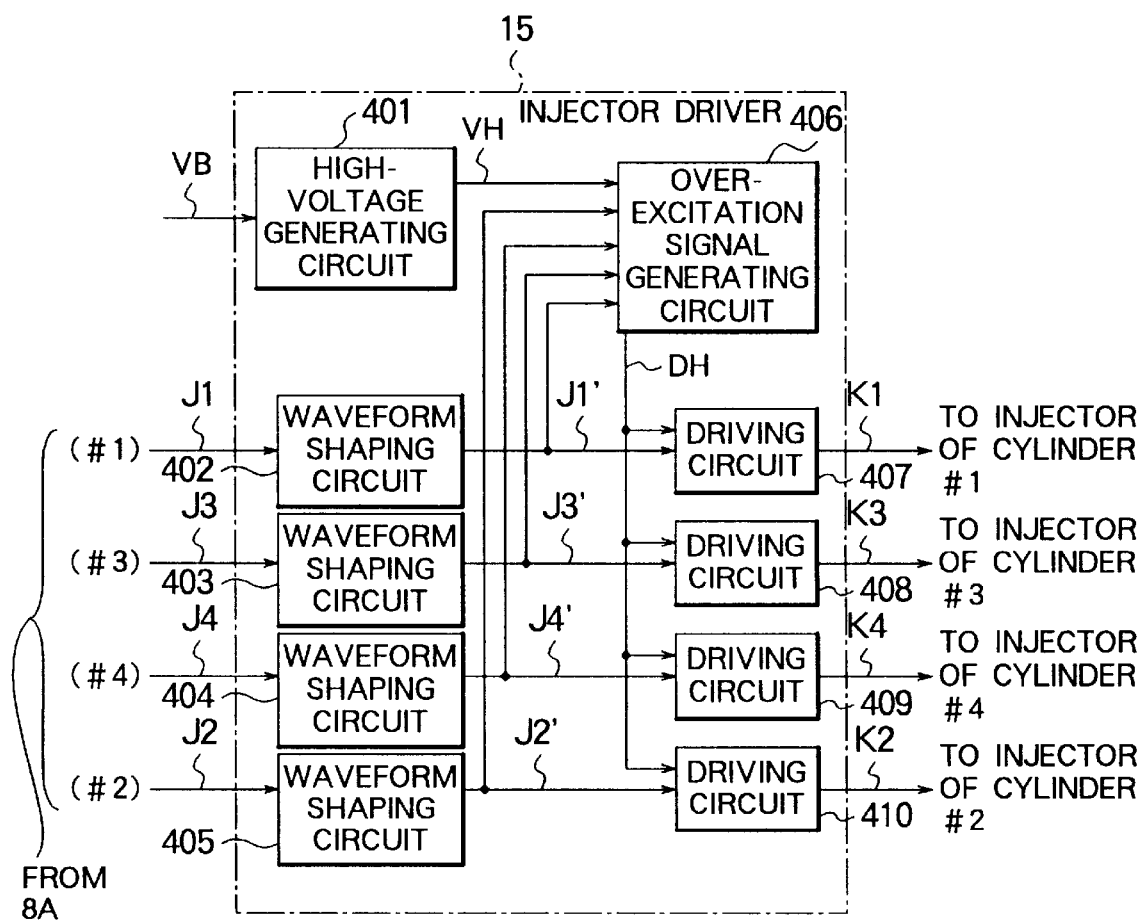
FIG. 7 is a block diagram showing circuit configuration of an injector driver employed in the cylinder injection type internal combustion engine system shown in FIG. 5.

At this juncture, it should be mentioned that the configuration of the fuel control system for the cylinder injection type engine is essentially identical with the system described hereinbefore in conjunction with FIGS. 5 and 7. The fuel control system according to the instant embodiment of the invention differs from the system described hereinbefore only in respect to the contents of programmed processing steps executed sequentially by the control unit 8A which may be constituted by a microprocessor or microcomputer.

Figure 8A:
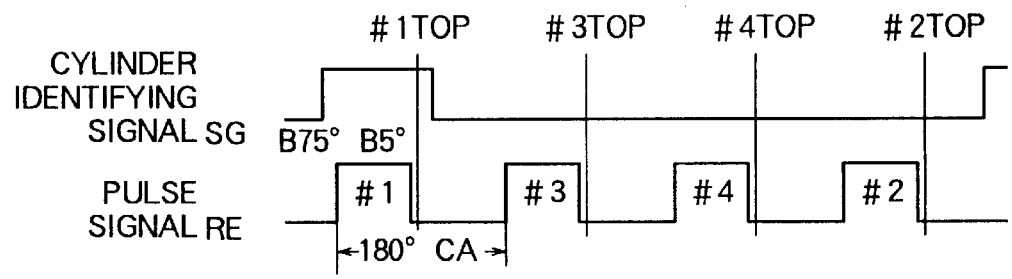
FIGS. 8A to 8D are timing charts for illustrating operations of the control system shown in FIG. 5.
Figure 8B:
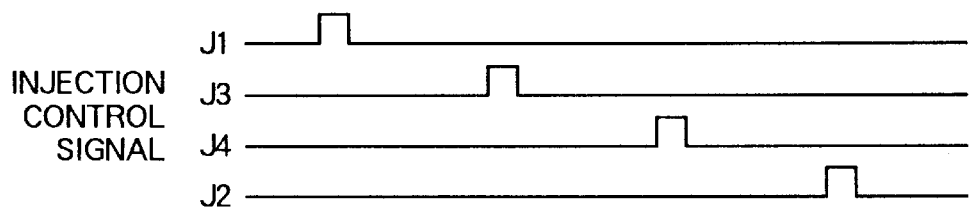
Figure 8C:
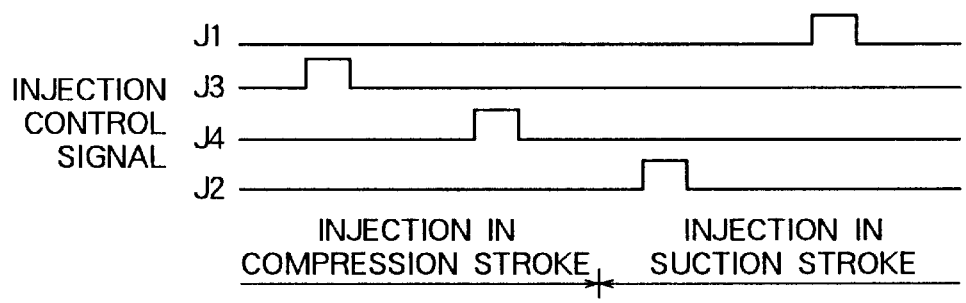

Reference is made to FIG. 2A which is a waveform diagram similar to that shown in FIG. 8A and FIG. 2B which illustrates graphically the injection timing in the cylinder injection type fuel control system according to the instant embodiment of the invention.

Furthermore, reference character TON2 designates the fuel injection timing in the system according to the instant embodiment of the invention. Besides, reference characters "SG", "RE", "J1, . . . , J4", "TON1", "B75°" and "B5°" are used in the same sense as those mentioned hereinbefore in conjunction with the conventional fuel control system.

According to the invention incarnated in the fuel control system for the cylinder injection type engine now under consideration, it is taught that when a preset desired injection timing changes remarkably from the preceding injection timing, then the desired magnitude of the change of the current injection timing is so limited as not to exceed the interval between the preceding injection timing for the adjacent engine cylinder and the injection timing for the engine cylinder to be currently controlled. With such simple control, the overlap of the overexcitation fuel injection periods between the plural direct fuel injectors 11A can be avoided while protecting the microcomputer or microprocessor constituting the control unit 8A against overload due to the control processing executed in every fuel injection in the conventional fuel control system.

Ordinarily, the desired or target fuel injection timing is set in terms of the crank angle (°CA). According to the invention, the restriction or limitation of the change in the fuel injection timing upon every fuel injection is so validated that the current overexcitation fuel injection period does not overlap the preceding overexcitation fuel injection for the adjacent cylinder.

Figure 6:
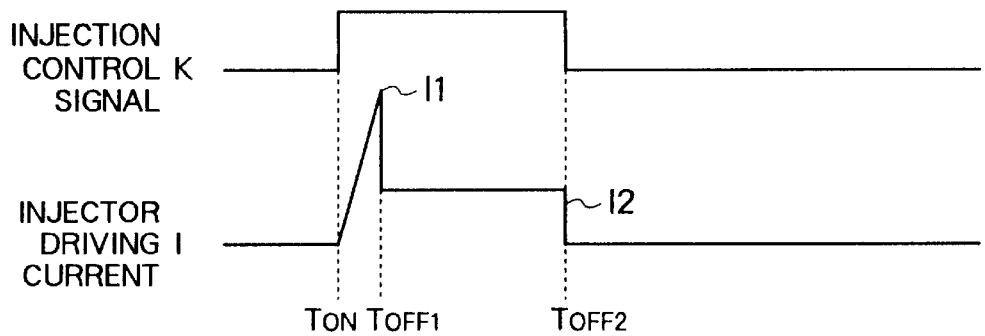
FIG. 6 is a waveform diagram for illustrating an injection control signal and a coil current flowing through a coil or solenoid of a direct fuel injector upon driving thereof with an overexcitation current.

With the phrase "overexcitation period", it is intended to mean the period from the time point TON to the time point TOFF1 which is taken for the driving current I of the direct fuel injector 11A to reach the predetermined value or level I1 (see FIG. 6). Thus, the overexcitation period remains substantially constant (e.g. on the order of 100 μsec.) independent of difference among the fuel injectors for the individual engine cylinders so long as the high voltage VH (see FIG. 7) supplied from the injector driver 15 is essentially constant.

Thus, the overexcitation period which can be represented in terms of the crank angle increases as the rotation speed (rpm) of the engine indicated by the pulse signal RE increases.

Under the circumstances, in the fuel control system for the cylinder injection type engine according to the instant embodiment of the invention, the limit value for the change in every fuel injection timing is set as large as possible in dependence on the engine rotation speed (rpm) while avoiding the overlap of the overexcitation periods in order to ensure a high freedom for the control of the injection timing.

It is further noted that the overlap of the overexcitation period between the fuel injections occurs only when the fuel injection timing changes by an amount corresponding to an interval between the current injection timing for the engine cylinder to be controlled currently and the preceding injection timing for the adjacent engine cylinder controlled immediately before (i.e., the interval equivalent to 180° CA in the case of the four-cylinder engine) within a period or interval between the ignition timings for the first mentioned cylinder and the second mentioned cylinder. Hereinafter, this period or interval will be referred to as the ignition interval.

In general, the desired or target fuel injection timings of the individual cylinders change continuously in the ordinary engine operation without undergoing remarkable change within one ignition interval. Thus, overlap of the overexcitation periods can occur only when the engine operation mode changes e.g. from the compression stroke fuel injection mode to the suction stroke fuel injection mode.

Thus, limitation of the change in the target injection timing is executed only during the transient period which immediately follows the change in the operation mode of the engine 1 in the cylinder injection type fuel control system according to the instant embodiment of the invention. Owing to such arrangement, the burden imposed on the control unit 8A can be mitigated.

Now, referring to FIGS. 1 and 2 together with FIGS. 5 to 7, the fuel injection timing control procedure or operation according to the instant embodiment of the invention will be described in detail bassed on the assumption that the operation mode of the engine 1 is changed over from the compression stroke fuel injection mode to the suction stroke fuel injection mode.

Parenthetically, the fuel control program illustrated in the fuel control processing flow of FIG. 1 is executed by the control unit 8A at a time point corresponding to a predetermined angular position of the crank shaft 1c, e.g. at every crank angle reference position B5° (at every ignition interval).

Referring to FIG. 1, the processing executed in a step S1 is adopted in the conventional fuel control system as well. By contrast, processings in the step S2 to the step S5 are executed according to the teachings of the invention incarnated in the instant embodiment. More specifically, the processing in the step S2 is executed during the transient period immediately after the change-over of the engine operation modes mentioned above, while in the step S3, arithmetic operation for determining the limit value in accordance with the engine rotation speed (rpm) is executed.

At first, the control unit 8A makes decision as to the engine operation mode on the basis of the information available from the output of the various sensors of the engine 1, determines the crank angle positions (e.g. B75° and B5°) on the basis of the cylinder identifying signal SG and the pulse signal RE, and then arithmetically determine the injection timing for the fuel injector 11A to be controlled currently (step S1).

At that time, the control unit 8A arithmetically determines not only the injection timing but also various control quantities for the engine 1.

When the engine operation mode is changed over from the compression stroke fuel injection mode to the suction stroke fuel injection mode, as illustrated in FIG. 2B, the injection in the suction stroke is effectuated for the cylinder #4 in succession to the fuel injection in the compression stroke for the cylinder #3.

Figure 8D:
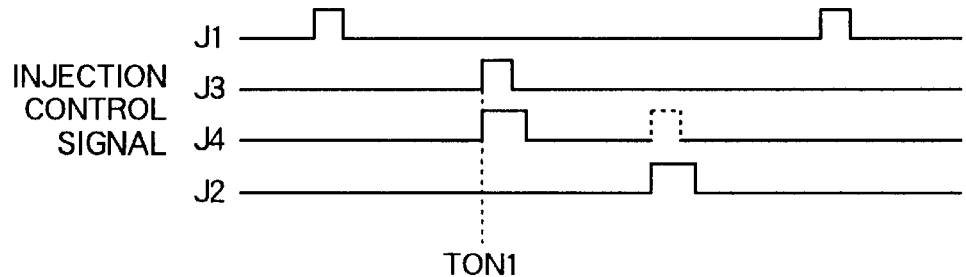

In that case, unless the processing for limiting the magnitude of change in the ignition timing is executed, then the fuel injection timing will shift by ca. one stroke (i.e., ca. 180° CA) in the leading direction, as a result of which overlap of the fuel injection for the cylinder #4 with the fuel injection for the cylinder #3 in the suction stroke will take place at the time point TON1 (see FIG. 8D).

By contrast, in the fuel control system according to the instant embodiment of the invention, the magnitude of change of every injection timing is limited (see FIG. 2B). Accordingly, even when the fuel injection mode changes from the compression stroke fuel injection mode to the suction stroke fuel injection mode due to the change-over of the engine operation mode (e.g. change-over to the acceleration mode), the overexcitation fuel injection is enabled at the time point TON2 after lapse of a predetermined time from the time point TONi at which fuel injection was performed for the preceding engine cylinder (cylinder #3).

As described hereinbefore, since the combustion taking place during the compression stroke is subtle, the fuel injection control in the compression stroke is carried out in the sufficiently warmed-up state of the engine which can be determined on the basis of the water temperature Tw, and thus in the relatively stable or steady state of the engine operation rather than in the transient engine operation state which can be detected on the basis of variation or deviation of the throttle opening degree θ.

On the other hand, in the transient operation state of the engine immediately after the change-over of the engine operation mode, the fuel injection timing is changed over from the injection timing in the compression stroke fuel injection mode to the injection timing in the suction stroke fuel injection mode, as is illustrated in FIG. 2B.

Consequently, the control unit 8A executes in succession to the step S1 for arithmetically determining the injection timing the step S2 for deciding whether the current time point is immediately after the operation state of the engine 1 has been changed over. Only when the decision step S2 results in affirmation "YES", the control unit 8A executes the processing for restricting or limiting the magnitude of change of the injection timing to the predetermined value (equivalent to the crank angle smaller than 180° CA) in steps S3 to S5.

On the contrary, when the decision step S2 results in negation "NO" (i.e., the current time point is not just after the change-over of the engine operation mode, the injection timing control is executed on the basis of the injection timing calculated in the step S1 and the period of the pulse signal RE outputted from the crank angle sensor 5 (step S6).

Now, description will turn to the processing for limiting or regulating, the fuel injection timing as executed in the steps S3 to S5.

At first, the limit value for limiting the magnitude of change or shift in the injection timing is arithmetically determined on the basis of the rotation speed (rpm) of the engine by reference to corresponding map data stored in the memory incorporated in the control unit 8A (step S3).

For the reason described previously, it is presumed that the limit value corresponding to the engine rotation number (rpm) Ne is arithmetically determined in accordance with the characteristic data (map data) which is graphically illustrated in FIG. 3. In other words, the limit value for limiting the change on shift (given in terms of crank angle) of the current injection timing from the timing for the preceding fuel injection is so set as to be smaller as the engine rotation number (rpm) Ne increases, because the overexcitation period given in terms of the crank angle becomes longer as the engine rotation number (rpm) Ne increases, giving rise to the possibility of overlap with the succeeding overexcitation period.

Subsequently, the desired or target injection timing for the cylinder to be currently controlled as determined in the step S1 is compared with the preceding injection timing determined at the crank angle reference position B5°, whereon in the step S4, it is decided whether the magnitude of the change between the preceding injection timing and the current injection timing falls within the range of the limit value (e.g. about 50° CA) determined in the step S3.

When it is decided in the step S4 that the change or shift of the current fuel injection timing in the leading direction from the preceding fuel injection timing exceeds the limit value (i.e., when the decision in the step S4 results in "NO"), then the fuel injection timing for the cylinder to be controlled currently is clipped by the limit value to thereby set the fuel injection timing by referencing the limit value (step S5), to thereby control the fuel injection timing for the fuel injector 11A to be controlled currently (step S6).

In this manner, the current fuel injection timing can be set at a time point at which a predetermined time period (corresponding to the overexcitation period) has lapsed from the preceding fuel injection timing.

On the other hand, when it is decided in the step S4 that the change (given in terms of crank angle) of the current fuel injection timing from the preceding one does not exceed the limit value (i.e., when the decision step S4 results in "YES"), then the limiting step S5 is skipped, and the fuel injection timing control step S6 is executed because there is no possibility of occurrence of overlap in the overexcitation period between the two adjacent engine cylinders (e.g. #3 and #4).

As can now be understood, simultaneous driving of plural fuel injectors 11A can be avoided by virtue of relatively simple arrangement that the decision is made as to the change (given in terms of CA) of the fuel injection timing in the step S4. Thus, there can be realized the control unit 8A optimally suited for controlling the fuel injection in the engine 1 by using the injector driver 15 which includes the high-voltage generating circuit 401 (see FIG. 7) and which is supplied with electric power from a single power source.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, when it is unnecessary to pay consideration to the enhanced freedom in the control of the fuel injection timing, the step S3 of arithmetically determining the limit value in dependence on the engine rotation speed may be spared. Besides, if reduction of the burden imposed on the fuel control system is of no concern, the decision step S4 for restricting validation of limitation of the change of the desired fuel injection timing to the transient period immediately after the change-over of the engine operation modes can also be spared.

Further, in the foregoing description of the fuel control system for the cylinder injection type engine, it has been assumed that the predetermined value (limit value) for limiting the change of the fuel injection timing is set at a value (ca. 50° CA) smaller than the interval between the ignition timings for the individual engine cylinders (180° CA), it goes without saying that the predetermined value may be set within a range of 200° CA to 360° CA because what is important is that no overlap of the overexcitation period occurs between the plural or adjacent engine cylinders. In that case, the current fuel injection timing will advance in the leading direction when compared with the preceding fuel injection timing.

Although the invention has been described in conjunction with the four-cylinder internal combustion engine, it is obvious that the invention can equally be applied to the internal combustion engine which includes a given number of cylinders in general.

Accordingly, all suitable modifications and equivalents may be resorted to, falling within the spirit and scope of the invention.

What is claimed is:

1. A fuel control system for a four cycle cylinder injection type internal combustion engine, comprising:

a) air flow sensor means provided in association with an intake pipe of said internal combustion engine for detecting an intake air flow fed to said internal combustion engine to thereby output corresponding information;

b) crank angle sensor means for detecting rotation speed of said internal combustion engine and a crank angle thereof to thereby output corresponding information;

c) fuel injector means for injecting fuel directly into individual cylinders of said internal combustion engine;

d) control means for controlling operation for driving said fuel injector means on the basis of said information, said control means being so arranged as to arithmetically determine a fuel injection quantity and fuel injection timings for said engine on the basis of said information for thereby driving said injector means in accordance with the result of said arithmetic operation, and e) means for preventing overlapping fuel injection timings during a transition from relatively light load compression stroke injection to relatively heavy load suction stroke injection, said preventing means comprising:

i) means for calculating a permissible change of every fuel injection timing of said injector means in a leading direction so that said change in said fuel injection timing does not exceed a predetermined value;

ii) means for determining whether or not a change from a preceding injection timing to a current injection timing will exceed the calculated permissible change, and iii) means for reducing said a change to the calculated permissible change if the determination by the means of ii) is "yes".

2. A fuel control system for a cylinder injection type internal combustion engine according to claim 1, wherein said predetermined value is set variably in dependence on the engine rotation number of said internal combustion engine.

3. A fuel control system for a cylinder injection type internal combustion engine according to claim 1, wherein said predetermined value is set to be smaller than a value corresponding to an interval intervening between ignition timings for the individual cylinders.

* * * * *